(12) United States Patent
Moon et al.

(10) Patent No.: US 10,499,301 B2
(45) Date of Patent: *Dec. 3, 2019

(54) METHOD AND APPARATUS FOR CONTROLLING HANDOVER IN MOBILE COMMUNICATION SYSTEM

(71) Applicant: Samsung Electronics Co., Ltd., Suwon-si, Gyeonggi-do (KR)

(72) Inventors: Jung-Min Moon, Suwon-si (KR); Nigam Anshuman, Bangalore (IN); Jung-Soo Jung, Seongnam-si (KR); Sun-Heui Ryoo, Yongin-si (KR); Sung-Jin Lee, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/884,998

(22) Filed: Jan. 31, 2018

(65) Prior Publication Data

US 2018/0160357 A1 Jun. 7, 2018

Related U.S. Application Data

(63) Continuation of application No. 15/026,845, filed as application No. PCT/KR2014/008879 on Sep. 24, 2014, now Pat. No. 9,894,584.

(30) Foreign Application Priority Data

Oct. 1, 2013 (KR) .......................... 10-2013-0117492
Jan. 28, 2014 (KR) .......................... 10-2014-0010873

(51) Int. Cl.
*H04W 36/30* (2009.01)
*H04W 76/19* (2018.01)
(Continued)

(52) U.S. Cl.
CPC ........... *H04W 36/30* (2013.01); *H04W 16/32* (2013.01); *H04W 24/04* (2013.01); *H04W 24/10* (2013.01);
(Continued)

(58) Field of Classification Search
CPC .................................................... H04W 36/30
(Continued)

(56) References Cited

U.S. PATENT DOCUMENTS 6,253,085 B1 6/2001 Bender
2010/0056153 A1 3/2010 Attar et al.
(Continued)

FOREIGN PATENT DOCUMENTS

CN 101668340 A 3/2010
CN 102740344 A 10/2012
(Continued)

OTHER PUBLICATIONS

3GPP; 3rd Generation Partnership Project; Technical Specification Group Radio Access Network; Evolved Universal Terrestrial Radio Access (E-UTRA); Mobility enhancements in heterogeneous networks (Release 11); 3GPP TR 36.839 V11.1.0; Dec. 2012; France.
(Continued)

*Primary Examiner* — Joel Ajayi
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Embodiments of the present disclosure provide a method and an apparatus for efficiently controlling a handover process and a Radio Link Failure (RLF) process. According to embodiments of the present disclosure, an operating method of a User Equipment (UE) includes starting a first timer while a
(Continued)

second timer regarding a radio link failure (RLF) is running, and if one of the first timer and the second timer expires, performing a radio resource control (RRC) connection re-establishment. When the handover and the RLF concurrently occur in the mobile communication system, the embodiments of the present disclosure can minimize the service interruption time by conducting the handover instead of the Radio Resource Control (RRC) connection re-establishment due to the RLF.

18 Claims, 19 Drawing Sheets

(51) Int. Cl.
| | |
|---|---|
| *H04W 76/27* | (2018.01) |
| *H04W 36/00* | (2009.01) |
| *H04W 36/08* | (2009.01) |
| *H04W 16/32* | (2009.01) |
| *H04W 24/04* | (2009.01) |
| *H04W 24/10* | (2009.01) |
| *H04W 36/04* | (2009.01) |
| *H04W 88/02* | (2009.01) |

(52) U.S. Cl.
CPC ....... *H04W 36/0083* (2013.01); *H04W 36/08* (2013.01); *H04W 36/305* (2018.08); *H04W 76/19* (2018.02); *H04W 76/27* (2018.02); *H04W 36/0005* (2013.01); *H04W 36/04* (2013.01); *H04W 88/02* (2013.01)

(58) Field of Classification Search
USPC .................................................. 455/436–448
See application file for complete search history.

(56) References Cited

U.S. PATENT DOCUMENTS

| | | | |
|---|---|---|---|
| 2010/0173626 A1* | 7/2010 | Catovic ................ | H04W 24/02 455/423 |
| 2011/0044285 A1 | 2/2011 | Jang et al. | |
| 2011/0103221 A1* | 5/2011 | Lee ....................... | H04L 5/0007 370/216 |
| 2011/0170516 A1* | 7/2011 | Hu .................... | H04W 36/0083 370/331 |
| 2013/0023302 A1 | 1/2013 | Sivanesan et al. | |
| 2013/0182563 A1 | 7/2013 | Johansson et al. | |
| 2014/0177468 A1* | 6/2014 | Kazmi ................ | H04L 41/0816 370/254 |

FOREIGN PATENT DOCUMENTS

| | | |
|---|---|---|
| CN | 103314618 A | 9/2013 |
| KR | 10-2002-0014798 A | 2/2002 |
| KR | 10-2007-0118807 A | 12/2007 |
| KR | 10-2011-0063779 A | 6/2011 |
| KR | 10-1233718 B1 | 2/2013 |
| WO | 2010/037133 A1 | 4/2010 |
| WO | 2010/080849 A2 | 7/2010 |
| WO | 2011/022149 A1 | 2/2011 |
| WO | 2012/016368 A1 | 2/2012 |
| WO | 2012/019362 A1 | 2/2012 |
| WO | 2012/176010 A2 | 12/2012 |

OTHER PUBLICATIONS

3GPP; 3rd Generation Partnership Project; Technical Specification Group Radio Access Network; Scenarios and requirements for small cell enhancements for E-UTRA and E-UTRAN (Release 12); 3GPP TR 36.932 V12.1.0; Mar. 2013; France.
Singhal et al.; LTE-Advanced: Handover Interruption Time Analysis for IMT-A Evaluation; Proceedings of 2011 International Conference on Signal Processing, Communication, Computing and Networking Technologies; 2011.
Ericsson et al.; 3GPP TSG-RAN WG2 #77; Tdoc R2-120464; Discussion on large-area HetNet simulations; Feb. 10, 2012; Dresden, Germany.
Qualcomm Incorporated; RLF recovery enhancements; 3GPP TSG-RAN WG2 meeting #81bis; R2-130933; Apr. 15-19, 2013; Chicago, IL.
CATT; Evaluation on adjusting parameters for the handover type; 3GPP TSG RAN WG2 Meeting #81bis; R2-130961; Apr. 15-19, 2013; Chicago, IL.
Samsung; Mobility performance for small cell deployment scenario 2; 3GPP TSG-RAN WG2 Meeting #81 bis; R2-131087; Apr. 15-19, 2013; Chicago, IL.
Qualcomm Incorporated; RLF recovery enhancements; 3GPP TSG-RAN WG2 meeting #82; R2-131663; May 20-24, 2013; Fukuoka, Japan.
Ericsson et al.; Shorter T310 at handover failure; 3GPP TSG-RAN WG2 #82; Tdoc R2-131667; May 20-24, 2013; Fukuoka, Japan.
CATT; Analysis on RLF recovery enhancements; 3GPP TSG RAN WG2 Meeting #82; R2-131741; May 20-24, 2013; Fukuoka, Japan.
Mediatek; Fast Reestablishment; 3GPP TSG-RAN2 #82 Meeting; R2-131776; May 20-24, 2013; Fukuoka, Japan.
Itri; Consideration on Recovery from Radio Link Failure in HetNet Deployments; 3GPP TSG-RAN WG2 #82; R2-131818; May 20-24, 2013; Fukuoka, Japan.
Samsung; Fallback cell for re-establishment; 3GPP TSG-RAN WG2 #82; R2-131909; May 20-24, 2013; Fukuoka, Japan.
Alcatel-Lucent et al.; Reduce Service Interruption Time with Adaptive RLF Trigger in HetNets; 3GPP TSG RAN WG2 Meeting #82; R2-132027; May 20-24, 2013; Fukuoka, Japan.
Intel Corporation; Evaluation of different T310 early termination methods; 3GPP TSG RAN WG2 Meeting #82; R2-132040; May 20-24, 2013; Fukuoka, Japan.
Huawei et al.; Flexible selling of RLF parameters to improve the overall mobility robustness for high-speed UEs; 3GPP TSG-RAN WG2 Meeting #82; R2-132074; May 20-24, 2013; Fukuoka, Japan.
Nokiea Siemens Networks et al.; Re-establishment Enhancements for HetNet; 3GPP TSG-RAN WG2 Meeting #82; R2-132087; May 20-24, 2013; Fukuoka, Japan.
Itri, Discussion on RRC Connection Re-establishment in HetNet Deployments, 3GPP TSG-RAN WG2 #83, R2-132351, Aug. 19-23, 2013, Barcelona, Spain.
European Office Action dated May 9, 2018, issued in the European Application No. 14850536.5.
Chinese Office Action dated Aug. 2, 2018, issued in the Chinese Patent Application No. 201480054799.0.
Chinese Office Action dated Apr. 23, 2019, issued in Chinese Application No. 201480054799.0.
European Office Action dated Feb. 13, 2019, issued in European Application No. 14 850 536.5-1214.
Chinese Office Action dated Sep. 2, 2019, issued in Chinese Application No. 201480054799.0.

* cited by examiner

METHOD AND APPARATUS FOR CONTROLLING HANDOVER IN MOBILE COMMUNICATION SYSTEM

CROSS-REFERENCE TO RELATED APPLICATION(S)

This application is a continuation application of prior application Ser. No. 15/026,845, filed on Apr. 1, 2016, which has issued as U.S. Pat. No. 9,894,584 on Feb. 13, 2018, which is a U.S. National Stage application under 35 U.S.C. § 371 of an International application number PCT/KR2014/008879, filed on Sep. 24, 2014, which is based on and claimed priority of a Korean patent application number 10-2013-0117492, filed on Oct. 1, 2013, in the Korean Intellectual Property Office and of a Korean patent application number 10-2014-0010873, filed on Jan. 28, 2014, in the Korean Intellectual Property Office, the disclosure of each of which is incorporated by reference herein in its entirety.

TECHNICAL FIELD

The present disclosure relates generally to a handover control method of a mobile communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Handover and Radio Link Failure (RLF) are independently operated processes in a mobile communication system. The RLF can be declared during a handover process. In this case, an attempted handover process fails, and Radio Resource Control (RRC) connection re-establishment is conducted. Since an RRC connection re-establishment process takes relatively much time compared with the handover process, its service interruption time is lengthened.

Meanwhile, in recent, the handover and the RLF concurrently take place more frequently in a heterogeneous network including a macro cell and a small cell. Hence, as the RLF is declared during handover preparation, a handover failure rate can increase and thus the service interruption time experienced by a User Equipment (UE) may increase.

DISCLOSURE

Technical Problem

To address the above-discussed deficiencies of the prior art, it is a primary aspect of the present disclosure to provide a method and an apparatus for efficiently controlling a handover process and a Radio Link Failure (RLF) process in a mobile communication system.

Another aspect of the present disclosure is to provide a method and an apparatus for reducing a handover failure rate in a mobile communication system.

Yet another aspect of the present disclosure is to provide a method and an apparatus for minimizing a service interruption time when handover and RLF concurrently take place in a mobile communication system.

Still another aspect of the present disclosure is to provide a method and an apparatus for minimizing a service interruption time by conducting handover, instead of Radio Resource Control (RRC) connection re-establishment, due to RLF when the handover and the RLF concurrently take place in a mobile communication system.

Technical Solution

According to one aspect of the present disclosure, an operating method of a User Equipment (UE) in a mobile communication system includes monitoring whether a radio link between a source enhanced NodeB (eNB) and the UE has a preset low channel gain, detecting a target eNB for handover, and when detecting at least one of the radio link having the low channel gain and the target eNB, performing handover within a shorter time than a preset normal time.

According to another aspect of the present disclosure, an apparatus of a UE in a mobile communication system includes a monitoring unit for monitoring whether a radio link between a source eNB and the UE has a preset low channel gain, a detection unit for detecting a target eNB for handover, and a process execution unit for, when detecting at least one of the radio link having the low channel gain and the target eNB, performing handover within a shorter time than a preset normal time.

Advantageous Effects

When the handover and the RLF concurrently occur in the mobile communication system, embodiments of the present disclosure can minimize the service interruption time by conducting the handover instead of the RRC connection re-establishment due to the RLF.

DESCRIPTION OF DRAWINGS

The above and other aspects, features, and advantages of certain exemplary embodiments of the present disclosure will be more apparent from the following description taken in conjunction with the accompanying drawings, in which.

BEST MODE

Figure 1:
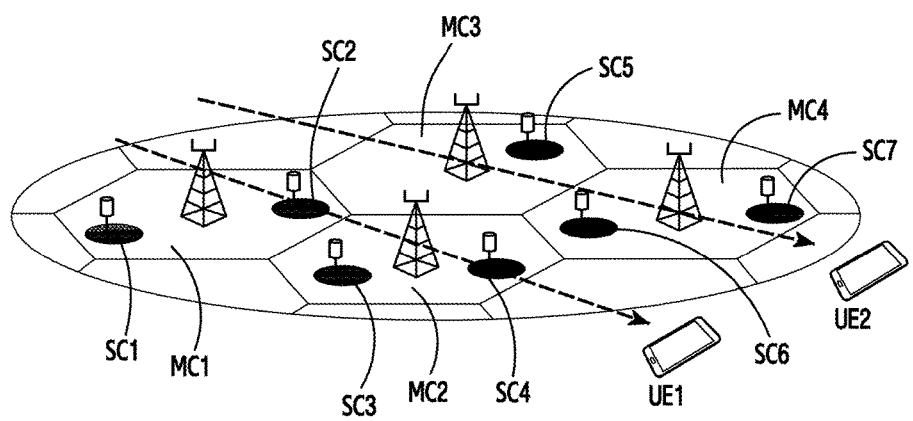
FIG. 1 is a diagram of a network structure of a mobile communication system according to an embodiment of the present disclosure.

FIG. 1 through FIG. 14 used to explain principles of the present disclosure are merely exemplary, and it shall not be interpreted that the present disclosure is limited to those drawings. Those skilled in the related art shall appreciate that the principles of the present disclosure can be equally embodied even in an arbitrary mobile communication system including a cell structure adequately deployed.

Exemplary embodiments of the present disclosure provide processing of a handover process and a Radio Link Failure (RLF) process of a User Equipment (UE) in a mobile communication system. In general, handover occurs when signal strength of a target enhanced NodeB (eNB) is greater than signal strength of a source eNB. This simplifies that the UE is located at an external angle of a source cell and accordingly a channel gain between the UE and the source eNB is low. As a result, it is highly likely that (i) handover occurring when the signal strength of the target eNB is greater than the signal strength of the source eNB and (ii) RLF occurring when the channel gain between the UE and the source eNB is low take place at the same time. For example, a mobile communication system such as $3^{rd}$ Generation Partnership Project (3GPP) Long Term Evolution (LTE)-Advanced describes the handover and the RLF using the following conditions of Table 1.

TABLE 1

| | conditions | preset time (timer) |
|---|---|---|
| Handover | $RSRP_{target} > RSRP_{serving} + \Delta$ | TTT (time-to-trigger) |
| RLF | $BLER_{PDCCH} < BLER_{threshold}$ or $CQI < Q_{out}$ | T310 |

As shown in Table 1, when the handover and RLF conditions are maintained during a preset time (timer), the handover and the RLF are declared and their related operations are performed. When the handover and RLF conditions are satisfied but not maintained during the preset time, the conditions are invalidated.

Basically, the handover and the RLF are independently operated processes. Accordingly, when a UE declares the RLF during the handover process, the UE performs the RRC connection re-establishment regardless of the remaining handover process. Herein, the handover and the RRC connection re-establishment cause service interruption during the following operations as shown in Table 2.

TABLE 2

| operations | required operations |
|---|---|
| Handover | Downlink synchronization → Uplink random access → Resource allocation |
| RRC connection re-establishment | Cell search → Downlink synchronization → System information acquisition → Uplink random access → Resource allocation |

As shown in Table 2, compared with the handover, the RRC connection re-establishment takes an additional time for the cell search and the system information acquisition. The cell search and the system information acquisition generally require a longer time than the downlink synchronization, the uplink random access, and the resource allocation. Hence, when the UE conducts the handover or the RRC connection re-establishment due to the RLF and wants to communicate with a new eNB, the handover can be more advantageous than the RRC connection re-establishment in view of the service interruption.

Exemplary embodiments of the present disclosure can be applied to a homogeneous network including the same kind of cells and a heterogeneous network including different kinds of cells. As shown in FIG. 1, in a heterogeneous network including macro cells MC1 through MC4 and small cells SC1 through SC7, handover occurs from the macro cell to the macro cell, from the macro cell to the small cell, from the small cell to the macro cell, and from the small cell to the small cell. Exemplary embodiments of the present disclosure can be generally applied regardless of such handover types.

Figure 2:
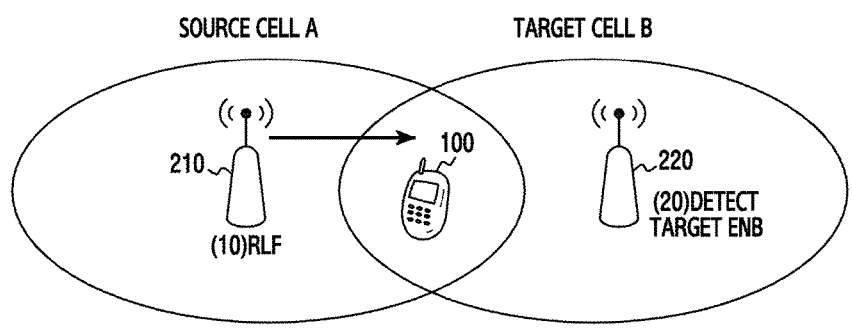
FIG. 2 is a diagram of handover and Radio Link Failure (RLF) frequently arising due to small cell deployment in a heterogeneous network.

As shown in FIG. 2, as the small cell is adopted to the heterogeneous network, handover 20 (or detecting a target eNB 220) and RLF 10 concurrently take place more frequently. Its reasons are as follows. First of all, the small cell has small coverage. In addition, when small cells are deployed with high density, a UE 100 detects many small cells (e.g., a source cell A, a target cell B). Hence, not only a handover region expands and but also a region satisfying the RLF condition also expands due to inter-cell interference. Exemplary embodiments of the present disclosure include processing in consideration of both of the handover and the RLF in such a heterogeneous network. Although embodiments of the present disclosure can be applied to a mobile communication system such as a heterogeneous network including a macro cell and a small cell, the scope of the present disclosure is not limited to that system. In addition, while the mobile communication system is assumed to be 3GPP LTE-Advanced in embodiments of the present disclosure, the scope of the present disclosure is not limited to that system.

According to embodiments of the present disclosure, when experiencing or expecting the handover and the RLF at the same time, the UE conducts the handover, instead of the RRC connection re-establishment due to the RLF, and thus minimizes its service interruption time.

Figure 3:
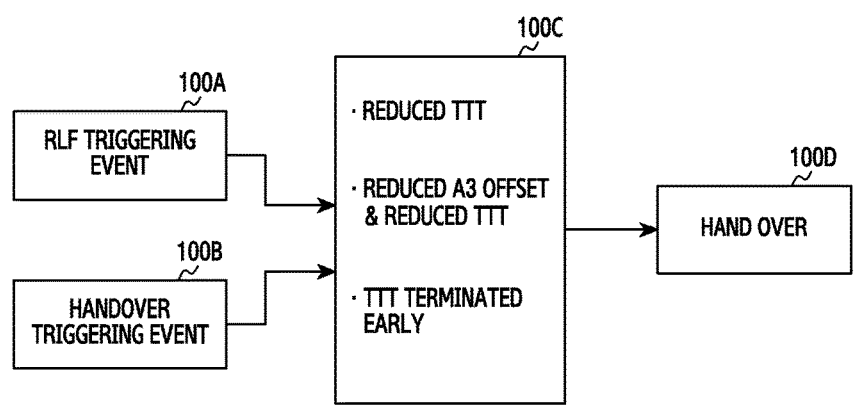
FIG. 3 is a simplified diagram of handover and re-establishment processing according to an embodiment of the present disclosure.

FIG. 3 is a simplified diagram of handover and re-establishment processing according to an embodiment of the present disclosure.

Referring to FIG. 3, when detecting an RLF triggering event 100A and a handover triggering event 100B at the same time or within a time range where they affect each other, a UE adequately adjusts a handover timer TTT and an RLF timer T310 (100C) according to in which order the handover timer (timer-to-trigger, TTT) start event and an RLF timer T310 start event occur, and conducts handover 100D according to the adjusted timer values. The RLF timer T310 and the handover timer TTT are initiated by different conditions.

The RLF timer T310 is initiated under the condition $BLER_{PDCCH} < BLER_{threshold}$ or $CQI < Q_{out}$ as shown in Table 1. Herein, $BLER_{PDCCH}$ is a Block Error Rate (BLER) of a Physical Downlink Control Channel (PDCCH) between an eNB and a UE, and CQI is a Channel Quality Indicator (CQI) indicating channel quality between the eNB and the UE. That is, when $BLER_{PDCCH}$ is a preset threshold BLER $BLER_{threshold}$ or the CQI is smaller than a preset value $Q_{out}$, the RLF timer T310 starts.

The handover timer TTT is initiated under the condition $RSRP_{target} > RSRP_{serving} + \Delta$ as shown in Table 1. Herein, $RSRP_{target}$ denotes a Reference Signal Received Power (RSRP) of a target eNB, and $RSRP_{serving}$ denotes an RSRP of a serving eNB (or a source eNB). That is, when the RSRP $RSRP_{target}$ of the target eNB is greater than the serving eNB RSRP $RSRP_{serving}$ by a preset A3 offset or more, the handover timer TTT starts.

Exemplary embodiments of the present disclosure are divided as follows, according to in which order the handover time TTT start event and the RLF timer T310 start event occur. In one embodiment, the RLF timer T310 is operating and the handover timer TTT is operating. In another embodiment, the RLF timer T310 is operating and the handover timer TTT is not yet initiated. In yet another embodiment, the RLF timer T310 is not yet initiated and the handover timer TTT is operating. Notably, when the RLF timer T310 is not yet initiated and the handover timer TTT is not yet initiated either, the UE performs a normal operation.

According to one embodiment, when both of the RLF timer T310 and the handover timer TTT are initiated and currently operating, the UE uses a reduced handover timer (reduced TTT), rather than a preset normal handover timer (normal TTT). Next, the UE performs handover using the adjusted parameter.

According to another embodiment, when the RLF timer T310 is initiated and currently operating but the handover timer TTT is not yet initiated, the UE uses a reduced A3 offset, rather than a preset normal A3 offset. Concurrently, the UE uses a reduced handover timer (reduced TTT), rather than a preset normal handover timer (normal TTT). Next, the UE performs handover using the adjusted parameters.

According to yet another embodiment, when the handover timer TTT is initiated and currently operating and RLF timer T310 is not yet initiated but the condition that the RLF timer T310 is expected to initiate soon is satisfied, the UE terminates the currently operating handover timer TTT early and conducts the handover.

In an embodiment, the network can preset and notify the normal handover timer (normal TTT) value and the reduced handover timer (reduced TTT). For example, the normal handover timer (normal TTT) can have a value such as 80 ms, 160 ms, and the reduced handover timer (reduced TTT) can have a value such as 20 ms, 40 ms. For example, the reduced handover timer can be defined as reduced TTT=normal TTT×α using a scaling factor α (<1).

In an embodiment, the network can preset and notify the normal A3 offset value and the reduced A3 offset value. For example, the normal A3 offset can have a value such as 2 dB, 3 dB, and the reduced A3 offset can have a value such as 0 dB, 1 dB. For example, the reduced A3 offset can be defined as reduced A3 offset=normal A3 offset×β using a scaling factor β (<1).

Figure 4A:
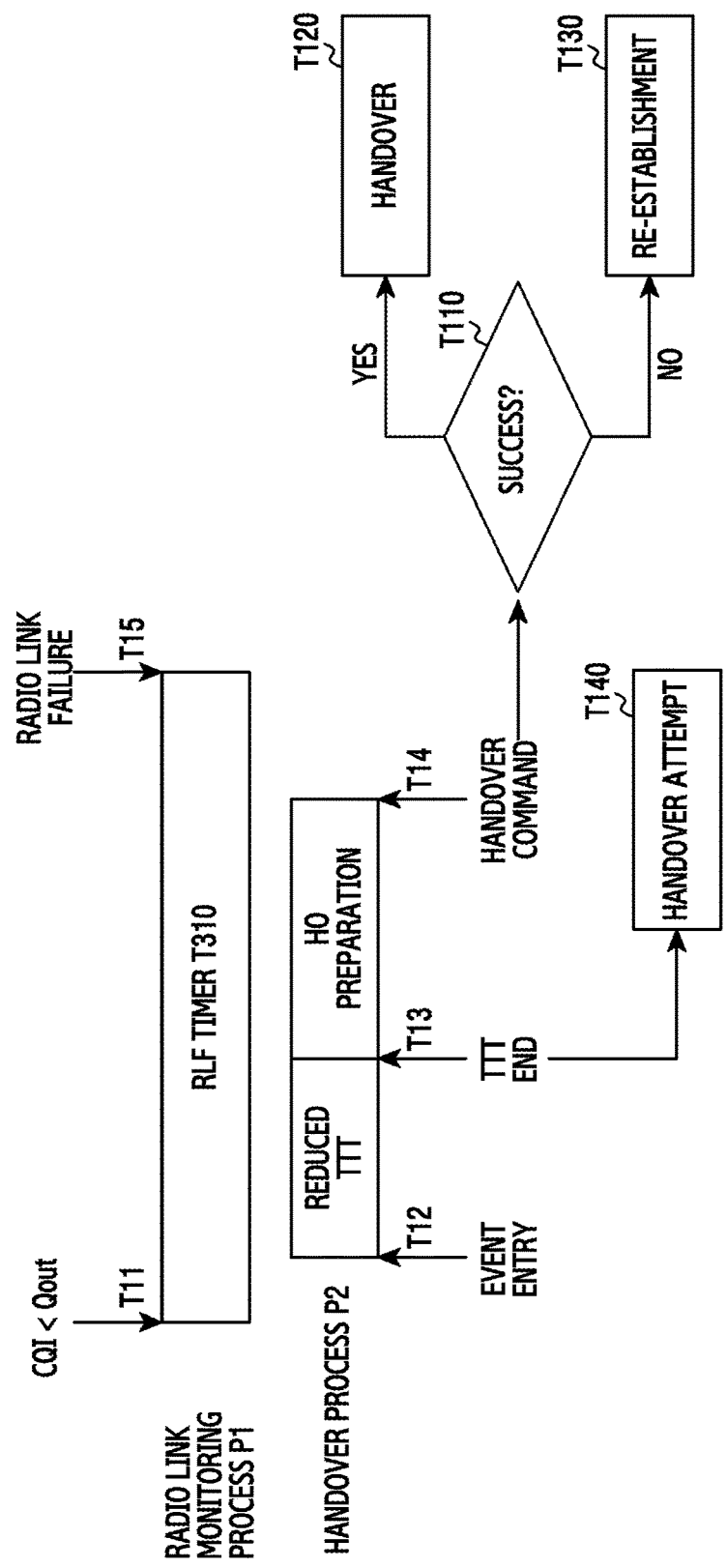
FIGS. 4A and 4B are timing diagrams of handover and re-establishment processing according to an embodiment of the present disclosure.

FIG. 4A is a timing diagram of handover and re-establishment processing according to an embodiment of the present disclosure. This timing diagram corresponds to the one embodiment as explained above. P1 indicates a radio link monitoring process, and P2 indicates a handover process.

Referring to FIG. 4A, when both of an RLF timer T310 and a handover timer TTT of a UE are initiated and currently operating (T11, T12), this indicates that a channel gain between the UE and a source eNB is low and a target eNB having higher signal strength than the source eNB is detected (T12). In this case, the handover timer TTT is not yet expired and the handover is not initiated yet, but a handover target eNB is discovered at a current time. Also, since the RLF timer T310 already starts, it is expected that the RLF will be declared within T310 (T11, T15). When the RLF is declared (T15) after the RLF timer T310 expires, the UE performs the RRC connection re-establishment. Typically, the time taken by the RRC connection re-establishment is longer than the time taken by the handover. For example, in an LTE-Advanced system, the RRC connection re-establishment is fulfilled in order of the cell search→the downlink synchronization→the system information acquisition→the uplink random access→the resource allocation as shown in Table 2. By contrast, the handover is fulfilled in order of the downlink synchronization→the uplink random access→the resource allocation.

In this case, since the handover target eNB is already discovered (T12), the UE needs to hand over though the RLF timer T310 is operating. Notably, it is less likely that the UE successfully hands over through successful message exchange (e.g., handover command) with the source eNB because the RLF timer T310 running signifies that the condition $BLER_{PDCCH} < BLER_{threshold}$ or $CQI < Q_{out}$ is satisfied. However, the handover success probability still remains, and the handover success probability may instantaneously increase considering fast fading influence of a radio channel. Accordingly, it is not advantageous not to attempt the handover.

When the RLF timer T 310 is operating, it is highly likely that the RLF is declared as the time expiry approaches. Hence, it is advantageous that the UE attempts the handover as early as possible. For doing so, the UE sends a message for triggering the handover (e.g., measurement report) to the eNB (T140) using the reduced handover timer (reduced TTT), rather than the preset normal handover timer (normal TTT), when the reduced TTT expires (T13). Next, when successfully receiving a handover command message from the eNB (T110 YES) within a preset waiting time Twait (T14), the UE continues the handover (T120). By contrast, when not successfully receiving the handover command message (T110 NO) within the waiting time Twait, the UE performs the RRC connection re-establishment (T130).

The waiting time Twait is a time taken by the source eNB to, after receiving the handover triggering message from the UE, conduct handover request/response and admission control with the target eNB.

In an embodiment, since the waiting time Twait greatly relies on backhaul delay between eNBs, the waiting time Twait is defined as a sum of two-way backhaul delay and an additional time margin.

In another embodiment, the waiting time Twait can be set to wait for at least recovery of the channel gain prior to the RRC connection re-establishment. This considers that the channel gain between the UE and the source eNB can be recovered during Twait and T310 may stop by itself.

In yet another embodiment, the waiting time Twait can be set by the UE. The time between the discovery of the handover target eNB (T12) and the RLF declaration (T15) as T310 expires is important to the UE. That is, the time $T_{remapping}$ from the TTT expiry (T13) to the T310 expiry (T15) is important. Hence, the waiting time Twait can be set based according to $T_{remapping}$. For example, when $T_{remapping}$ is greater or smaller than a certain value, T310 and Twait may be scaled by increasing or decreasing T310 and Twait by a certain value or by multiplying the current T310 and Twait by a certain factor.

In an embodiment, the RRC connection re-establishment can be conducted after reduced TTT+Twait based on the handover time TTT start time, and reduced TTT can be set to satisfy the condition reduced TTT+Twait<normal TTT The waiting time Twait is the time for the UE to discover the target eNB, to trigger the handover, and to wait for the handover command message from the source eNB. When T310 expires during Twait, it is advantageous to wait Twait and to determine whether the handover command message is successfully received, rather than conducting the RRC connection re-establishment after the RLF is declared immediately upon the T310 expiry. Hence, in another embodiment, when T310 expires during Twait, the RLF declaration time can be set to the Twait end time, rather than T310 end time.

Figure 4B:
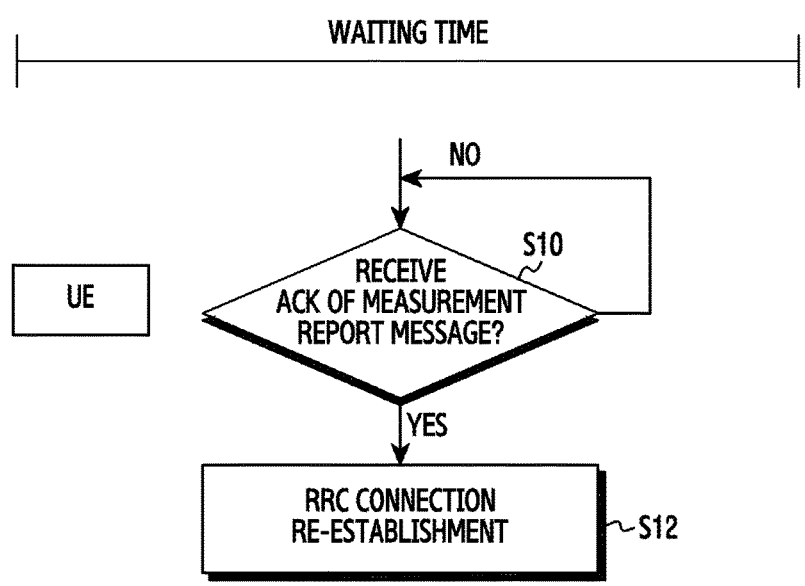

Referring to FIG. 4B, in another embodiment, when receiving an Acknowledgement (ACK) of the measurement report message from a serving eNB during the waiting time Twait in S10, the UE performs the RRC connection re-establishment in S12 immediately upon receiving the ACK of the measurement report message, rather than waiting until the waiting time Twait.

The measurement report message is a message transmitted to the serving eNB when the UE satisfies a handover event, for example, the condition $RSRP_{target}$>$RSRP_{serving}$+Δ during TTT. When successfully receiving the measurement report message, the serving eNB sends an ACK of the measurement report message to the UE. Also, the serving eNB sends a handover request message to the target eNB so that the target eNB can recognize the UE handover to the target eNB. In this case, that is, when the serving eNB successfully receives the measurement report message from the UE, the target eNB knows the handover attempt of the UE though the UE does not successfully receives the handover command message from the serving eNB and thus the RRC connection re-establishment can be conducted and finished within a relatively short time. Hence, the UE conducts the RRC connection re-establishment immediately upon receiving the ACK of the measurement report message, without having to wait until the waiting time Twait. This is true for a case where the UE uses the normal TTT and a case where the UE uses the reduced TTT.

Figure 7:
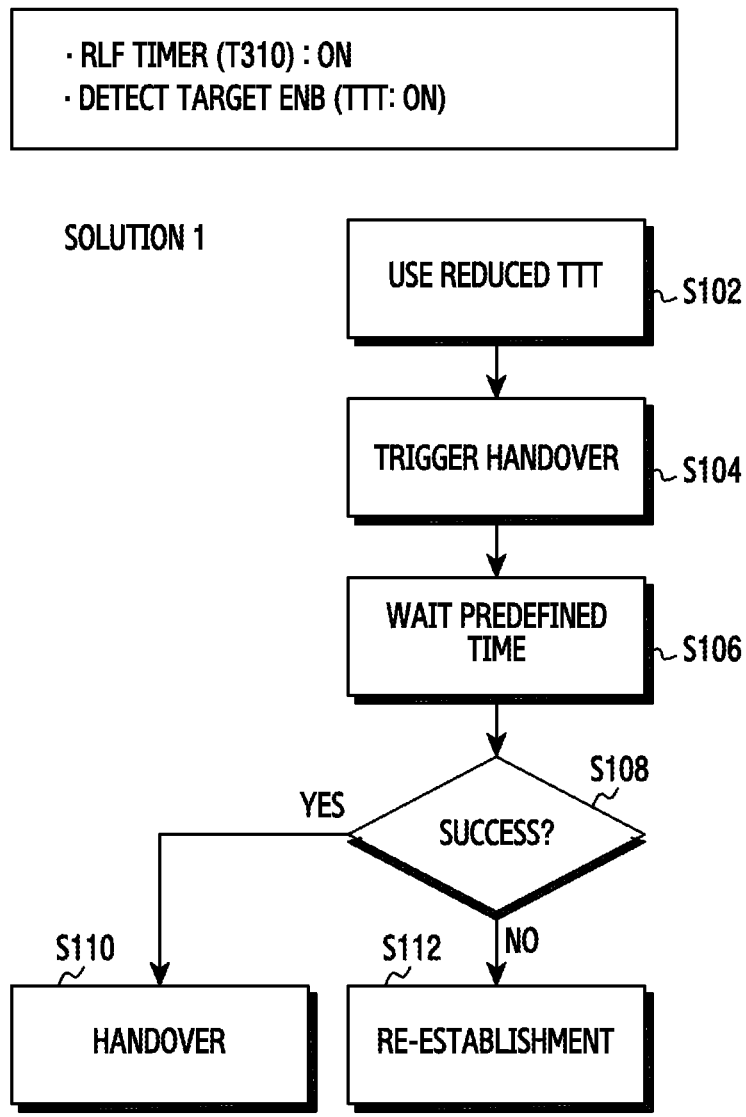
FIG. 7 is a flowchart of handover and re-establishment processing according to an embodiment of the present disclosure.

FIG. 7 is a flowchart of handover and re-establishment processing according to an embodiment of the present disclosure, where the RLF timer T310 is turned on, and the handover timer TTT is turned on since the target eNB is detected. This flowchart corresponds to the timing diagrams of FIG. 4A and FIG. 4B.

Referring to FIG. 7, in S102, the UE uses the reduced TTT (T12 of FIG. 4A). When the reduced TTT expires (T13), the UE triggers handover by sending a handover triggering message to a source eNB in S104. In S106, the UE waits the predefined time Twait. When receiving a handover command from the source eNB within the predefined time Twait, that is, when confirming the successful handover attempt in S108, the UE hands over in S110. When confirming no handover attempt success in S108, the UE performs re-establishment in S112.

Figure 5A:
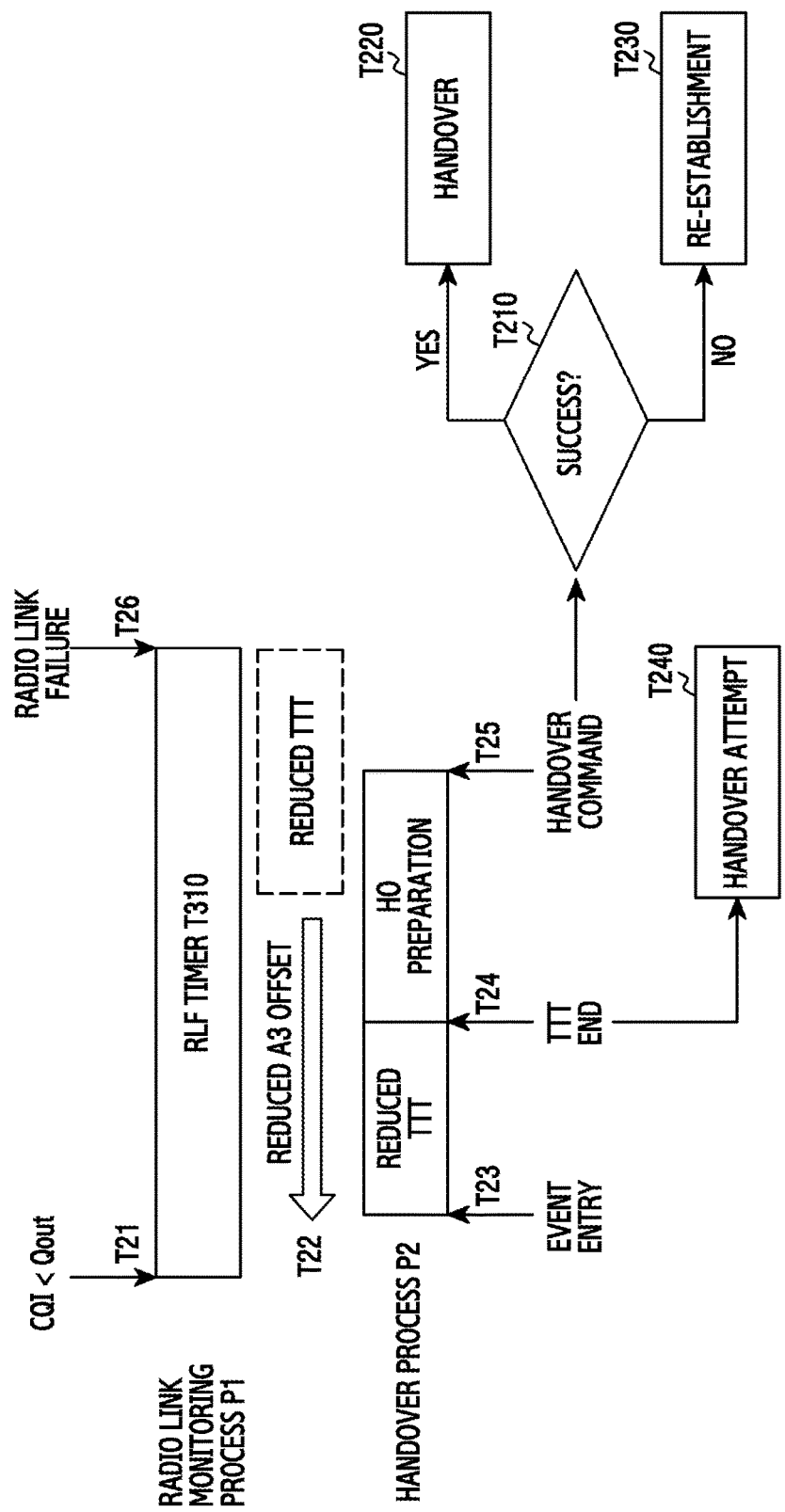
FIGS. 5A and 5B are timing diagrams of handover and re-establishment processing according to another embodiment of the present disclosure.

FIG. 5A is a timing diagram of handover and re-establishment processing according to another embodiment of the present disclosure. This timing diagram corresponds to the another embodiment as described earlier. P1 indicates a radio link monitoring process, and P2 indicates a handover process.

Referring to FIG. 5A, the RLF timer T310 of the UE already starts and is currently operating (T21), but an adequate handover target eNB is not discovered and thus the handover timer TTT is not initiated. Despite the low channel gain with the source eNB, it is difficult for the UE to maintain the current connection because there is neighboring eNB having better signal strength than the source eNB by the normal A3 offset. In this case, it is advantageous that the UE actively discovers a handover target eNB and then hands over, rather than passively waiting for the expiry of the RLF timer T310 and the RRC connection re-establishment. This is because the RRC connection re-establishment cases severer service interruption than the handover. To rapidly discover the target eNB, the UE uses the reduced A3 offset, instead of the preset normal A3 offset. When the target eNB is discovered using the reduced A3 offset, the handover can be conducted though the signal strength of the neighboring eNB is not that greater than the source eNB. Hence, ping-pong is expected to increase. However, when the network adequately supports the handover, it can cause a shorter service interruption than the RRC connection re-establishment and accordingly can be preferred by the UE.

When discovering the handover target eNB (T23) using the reduced A3 offset (T22), the UE attempts the handover even though the RLF timer T310 is operating. In this case, since the handover target eNB is already discovered (T23), the UE needs to hand over even though the RLF timer T310 is operating. Yet, since the RLF timer T310 running signifies that the condition $BLER_{PDCCH}$<$BLER_{threshold}$ or $CQI$<$Q_{out}$ is satisfied, it is less likely that the UE successfully hands over through successful message exchange (e.g., handover command) with the source eNB. However, the handover success probability still remains, and the handover success probability may instantaneously increase considering fast fading influence of the radio channel. Thus, it is not advantageous not to attempt the handover.

When the RLF timer T 310 is operating, it is highly likely that the RLF is declared as the time expiry approaches. Hence, it is advantageous that the UE attempts the handover as early as possible. For doing so, the UE sends a message for triggering the handover (e.g., measurement report) to the eNB (T240) using the reduced handover timer (reduced TTT), rather than the preset normal handover timer (normal TTT), when the reduced TTT expires (T24). Next, when successfully receiving a handover command message from the eNB (T210 YES) within a preset waiting time Twait (T25), the UE continues the handover (T220). By contrast, when not successfully receiving the handover command message (T210 NO) within the waiting time Twait, the UE performs the RRC connection re-establishment (T230).

The waiting time Twait is the time taken by the source eNB to, after receiving the handover triggering message, conduct handover request/response and admission control with the target eNB.

In an embodiment, since the waiting time Twait greatly relies on backhaul delay between eNBs, the waiting time Twait is defined as a sum of two-way backhaul delay and an additional time margin.

In another embodiment, the waiting time Twait can be set to wait for at least the channel gain recovery prior to the RRC connection re-establishment. This considers that the channel gain between the UE and the source eNB can be recovered and T310 may stop by itself.

In yet another embodiment, the waiting time Twait can be set by the UE. The time between the discovery of the handover target eNB (T12) and the RLF declaration (T15) as T310 expires is important to the UE. That is, the time $T_{remapping}$ from the TTT expiry (T13) to the T310 expiry (T15) is important. Hence, the waiting time Twait can be set based according to $T_{remapping}$. For example, when $T_{remapping}$ is greater or smaller than a certain value, T310 and Twait may be scaled by increasing or decreasing with a certain value or by multiplying the current T310 and Twait by a certain factor.

In an embodiment, the RRC connection re-establishment can be conducted after reduced TTT+Twait based on the handover time TTT start time, and reduced TTT can be set to satisfy the condition reduced TTT+Twait<normal TTT.

The waiting time Twait is the time for the UE to discover the target eNB, to trigger the handover, and to wait for the handover command message from the source eNB. When T310 expires during Twait, it is advantageous to wait Twait and to determine whether the handover command message is successfully received, rather than conducting the RRC connection re-establishment after the RLF is declared immediately upon the T310 expiry. Hence, in another embodiment, when T310 expires during Twait, the RLF declaration time can be set to the Twait end time, rather than T310 end time.

Figure 5B:
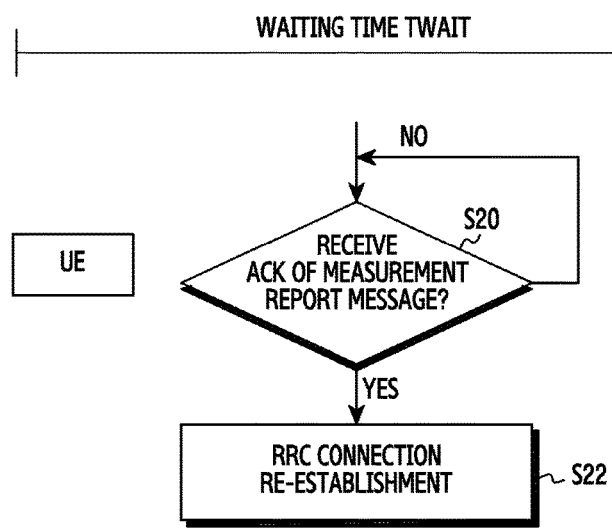

Referring to FIG. 5B, in another embodiment, when receiving an ACK of the measurement report message from a serving eNB during the waiting time Twait in S20, the UE performs the RRC connection re-establishment in S22 immediately upon receiving the ACK of the measurement report message, rather than waiting until the waiting time Twait.

The measurement report message is the message transmitted to the serving eNB when the UE satisfies a handover event, for example, the condition $RSRP_{target} > RSRP_{serving} + \Delta$ during TTT. When successfully receiving the measurement report message, the serving eNB sends an ACK of the measurement report message to the UE. Also, the serving eNB sends a handover request message to the target eNB so that the target eNB can recognize the UE handover to the target eNB. In this case, that is, when the serving eNB successfully receives the measurement report message from the UE, the target eNB knows the handover attempt of the UE though the UE does not successfully receives the handover command message from the serving eNB and accordingly the RRC connection re-establishment can be conducted and finished within a relatively short time. Hence, the UE conducts the RRC connection re-establishment immediately upon receiving the ACK of the measurement report message, without having to wait until the waiting time Twait. This is true for a case where the UE uses the normal TTT and a case where the UE uses the reduced TTT.

Figure 8:
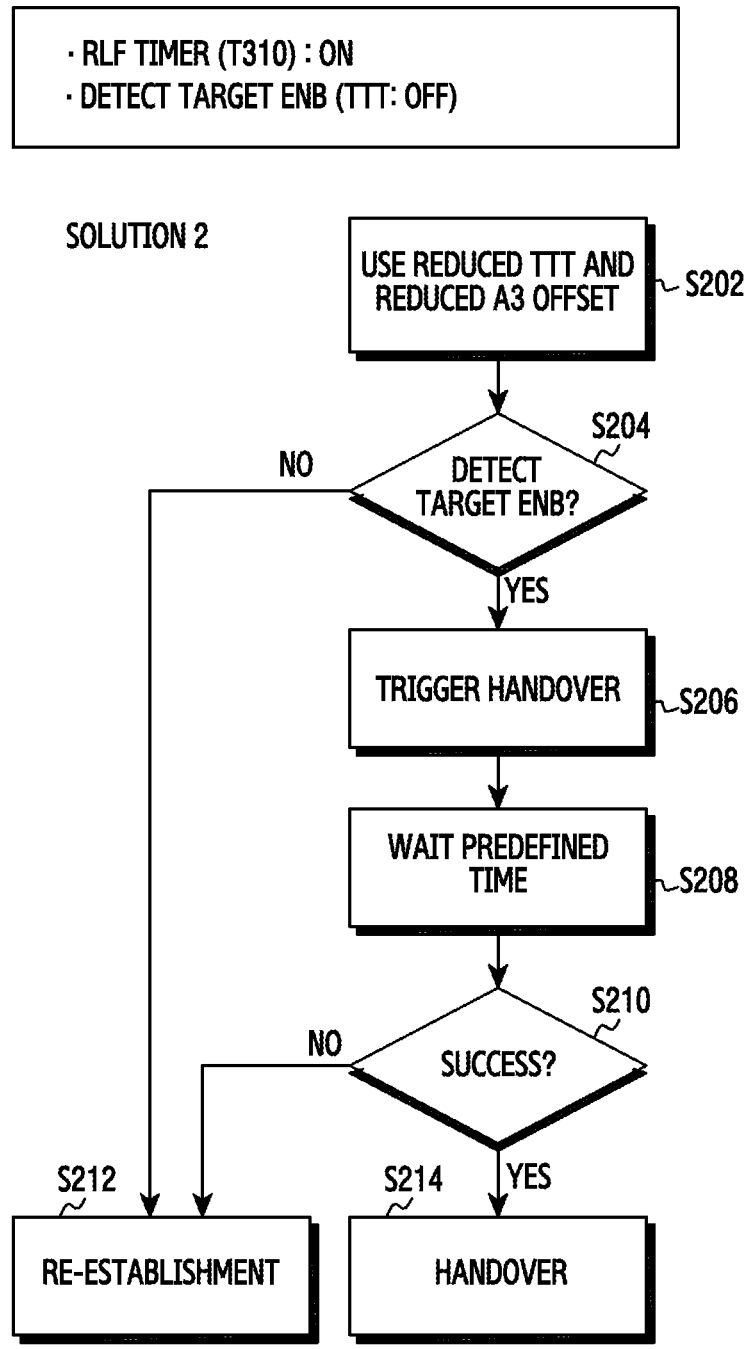
FIG. 8 is a flowchart of handover and re-establishment processing according to another embodiment of the present disclosure.

FIG. 8 is a flowchart of handover and re-establishment processing according to another embodiment of the present disclosure, where the RLF timer T310 is turned on, and the handover timer TTT is turned off since the target eNB is not detected. This flowchart corresponds to the timing diagrams of FIG. 5A and FIG. 5B.

Referring to FIG. 8, in S202, the UE uses the reduced A3 offset and the reduced TTT (T22, T23 of FIG. 5A). In S204, the UE determines whether a handover target eNB is detected. When not detecting the handover target eNB in S204, the UE performs re-establishment in S212. By contrast, when detecting the handover target eNB in S204, the UE goes to S206.

When the reduced TTT expires (T24), the UE triggers handover by sending a handover triggering message to a source eNB in S206. In S208, the UE waits the predefined time Twait. When receiving a handover command from the source eNB within the predefined time Twait, that is, when confirming the successful handover attempt in S210, the UE hands over in S214. When confirming no handover attempt success in S210, the UE performs re-establishment in S212.

Figure 6:
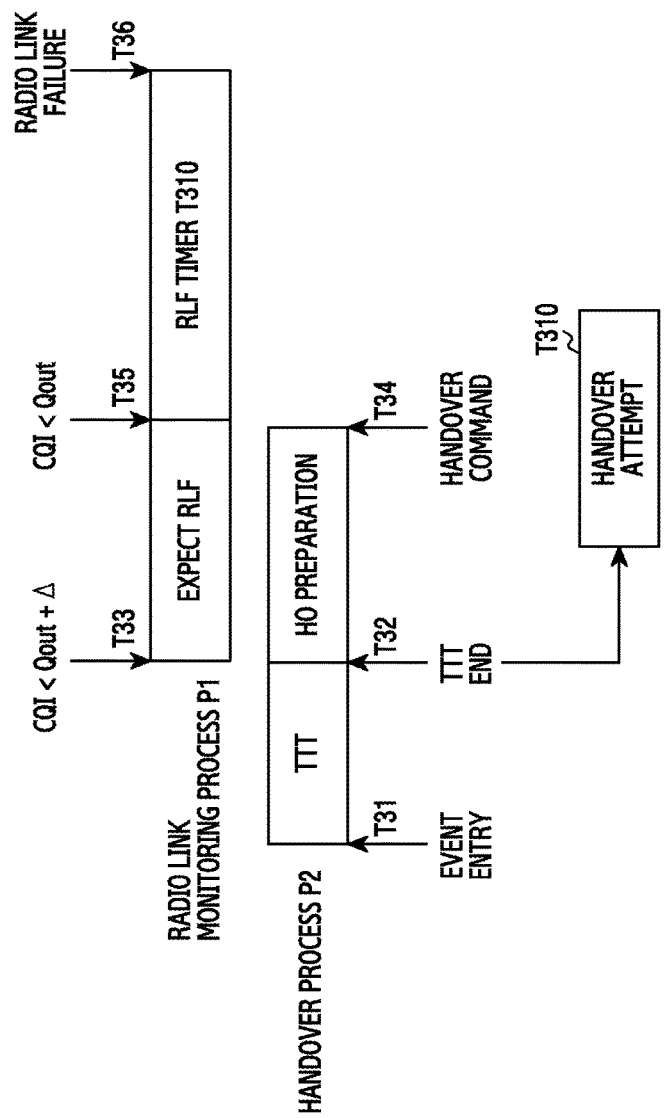
FIG. 6 is a timing diagram of handover and re-establishment processing according to yet another embodiment of the present disclosure.

FIG. 6 is a timing diagram of handover and re-establishment processing according to yet another embodiment of the present disclosure. This timing diagram corresponds to the yet another embodiment as described earlier. P1 indicates a radio link monitoring process, and P2 indicates a handover process.

Referring to FIG. 6, the yet another embodiment considers that (i) the UE detects a handover target eNB and the handover timer TTT is currently operating, (ii) the condition $BLER_{PDCCH} < BLER_{threshold}$ or $CQI < Q_{out}$ is not satisfied and the RLF timer T310 does not yet start, but (iii) the condition that the RLF timer T310 is expected to initiate soon is satisfied. Herein, the condition corresponding to (iii) can be defined as $BLER_{PDCCH} < BLER_{threshold} + \Delta$ $(=BLER_{RLF,margin})$ or $CQI < Q_{out} + \Delta$ $(=Q_{out,margin})$.

In this case, the handover timer TTT is not yet expired and thus the handover is not initiated, but the handover target eNB at the current time is discovered (T31). Also, although the RLF timer T310 is not initiated, the channel gain between the UE and the source eNB is to greatly decrease because the RLF caution condition is satisfied (T33). Hence, it is advantageous that, before the RLF timer T310 of the UE starts, the UE rapidly attempts the handover to the currently discovered target eNB and successfully receives the handover command message.

When detecting a target eNB (T31) having greater signal strength than the source eNB by the normal A3 offset, the UE first operates the normal handover timer (normal TTT) (between T31 and T23). When detecting the RLF caution condition (T33) in the RLF process while the normal handover timer (normal TTT) is operating, the UE aborts the currently operating normal handover timer (normal TTT) early (T32), attempts handover by sending a handover triggering message (e.g., measurement report) to the source eNB, and performs normal handover (T310).

The time interval (between T33 and T35) for the RLF caution is defined so that the UE can successfully receive the handover command message from the source eNB before the RLF timer T310 starts (T35) (before $BLER_{PDCCH} < BLER_{threshold}$ or $CQI < Q_{out}$). In an embodiment, the RLF caution time interval is defined to be longer than the time taken by the source eNB and the target eNB for the handover request message exchange and the admission control. Through such a configuration, when the handover is initiated by the RLF caution time interval, the UE can receive the handover command message (T34) before the RLF timer T310 starts (T35).

It is assumed that $T_{HOprep}$ is the time taken by the source eNB and the target eNB for the handover request message exchange and the admission control, and $T_{RLFcaution}$ is the RLF caution time interval. $T_{RLFcaution}$ depends on $BLER_{RLF,margin}$ or $Q_{out,margin}$. For example, as the margin increases, $T_{RLFcaution}$ also increases. As the margin decreases, $T_{RLFcaution}$ also decreases. In an embodiment, the eNB defines $BLER_{RLFcaution}$ or $Q_{out,margin}$ so as to satisfy $T_{HOprep} < T_{RLFcaution}$.

Figure 9:
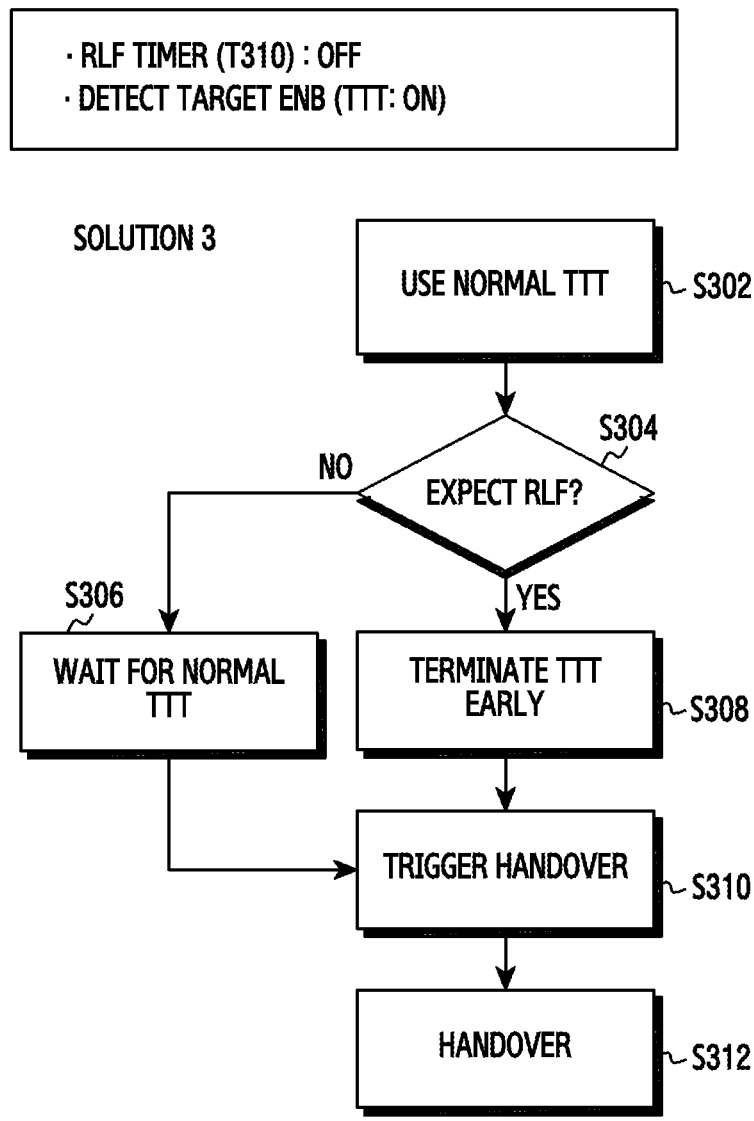
FIG. 9 is a flowchart of handover and re-establishment processing applied based on various situations according to yet another embodiment of the present disclosure.

FIG. 9 is a flowchart of handover and re-establishment processing according to yet another embodiment of the present disclosure, where the RLF timer T310 is turned off, and the handover timer TTT is turned on since the target eNB is detected. This flowchart corresponds to the timing diagrams of FIG. 6.

Referring to FIG. 9, the UE uses the normal TTT (between T31 and T32 of FIG. 6) in S302 and determines whether the RLF is expected (T33) in S304. When expecting the RLF in S304, the UE terminates the TTT early in S308 and goes to S310. When not expecting the RLF in S304, the UE waits for the normal TTT in S306. When the normal TTT ends, the UE goes to S310. The UE triggers handover by sending a handover triggering message to a source eNB in S310, and performs normal handover in S312.

The above-stated embodiments of the present disclosure provide three different solutions according to whether the RLF timer T310 and the handover target cell detection timer TTT are operating (ON/OFF). When both of T310 and TTT have a value greater than zero second, a plurality of solutions can be applied to one situation as shown in FIG. 10A through FIG. 10D.

A solution 3 (the embodiment of FIG. 9) can be applied to a situation A (see FIG. 10A), the solution 3 (the embodiment of FIG. 9) and a solution 1 (the embodiment of FIG. 7) can be applied to a situation B (see FIG. 10B), a solution 2 (the embodiment of FIG. 8) and the solution 1 (the embodiment of FIG. 7) can be applied to a situation C (see FIG. 10C), and the solution 2 (the embodiment of FIG. 8) and the solution 1 (the embodiment of FIG. 7) can be applied to a situation D. Since the embodiments of the present disclosure considers even the TTT end time, there is no need to consider a situation after the TTT end. Hence, when the plurality of the solutions is applied, a criterion for selecting which one of solutions is required. In an embodiment, when the plurality of the solutions completes, the selection criterion uses a minimum TTT and a minimum T310. For example, the eNB can provide the minimum TTT and the minimum T310 to the UE. The minimum TTT can be set to the same value as or a different value from the original reduced TTT. Yet, the minimum TTT should be set to a value smaller than or equal to the reduced TTT.

Figure 10A:
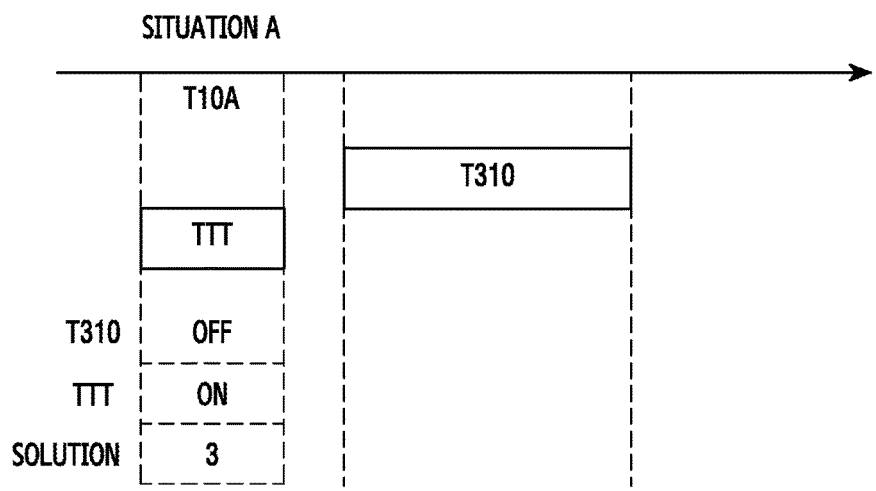
FIGS. 10A through 10D are diagrams of handover and re-establishment processing in various situations according to an embodiment of the present disclosure.
Figure 10B:
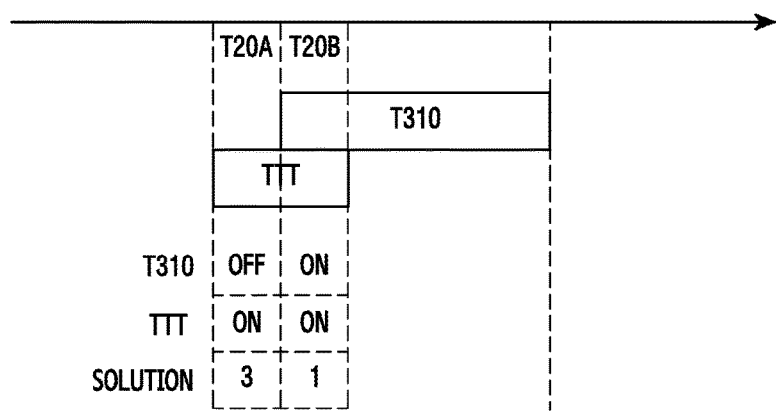
Figure 10C:
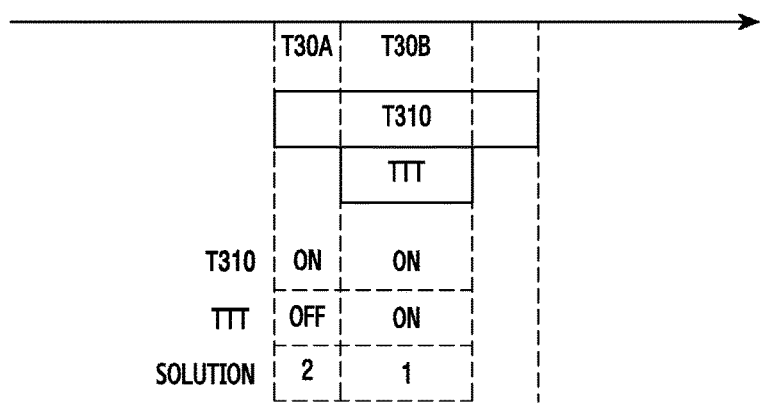
Figure 10D:
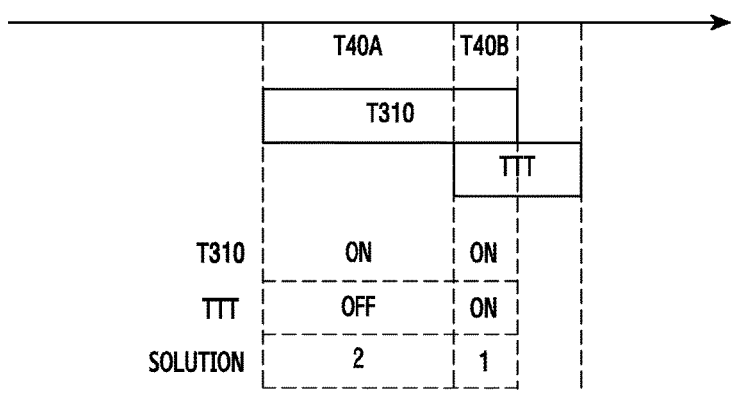

Referring to FIG. 10D, in the situation B, while the solution 3 can be applied to a TTT start point (T20A), the solution 1 can be applied after T310 starts (T20B). However, since the UE and the eNB operate in sequence based on time, there is no saying whether T310 starts when the solution 3 can be applied. In an embodiment, the UE determines whether the TTT exceeds or falls below the minimum TTT when the solution 3 satisfies a condition for early terminating the TTT ($CQI < Q_{out} + Q_{out,margin}$). When the TTT exceeds the minimum TTT, the UE applies the solution 3. When the TTT falls below the minimum TTT, the UE does not apply the solution 3, waits a little longer, and then applies the solution 1 when the T310 starts. This is to give the UE a chance to observe suitability of the target eNB a little bit more because unnecessary handover such as ping pong arises when the handover is conducted with a too short TTT.

Figure 11:
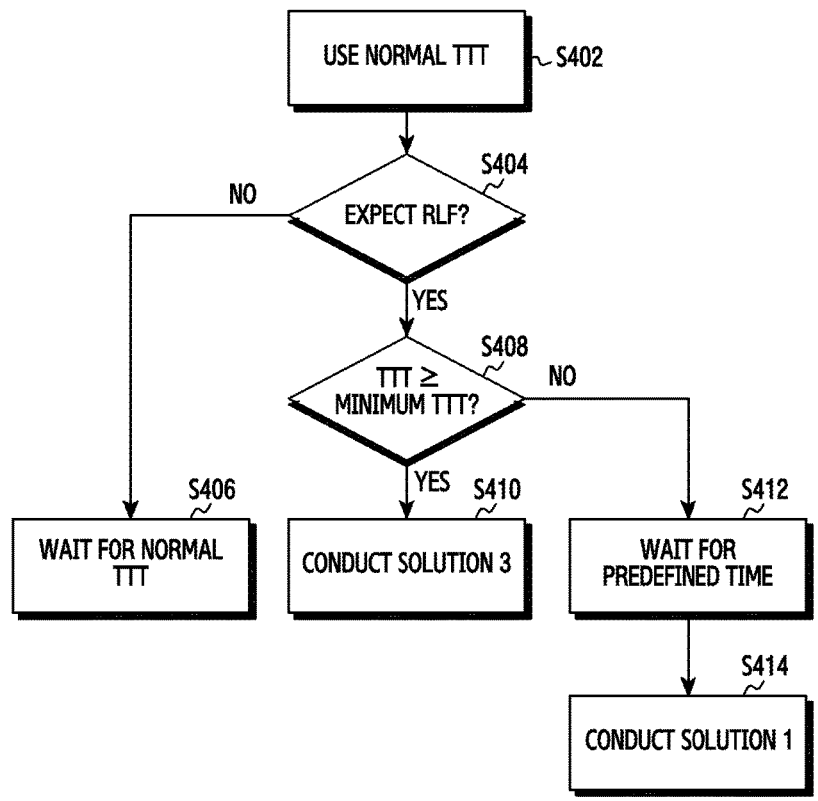
FIG. 11 is a flowchart of a method for selecting a plurality of solutions according to an embodiment of the present disclosure.

FIG. 11 is a flowchart of a method for selecting a plurality of solutions according to an embodiment of the present disclosure. This flowchart corresponds to selecting the solution 3 and the solution 1 in the situation B of FIG. 10B.

Referring to FIG. 11, the UE uses the normal TTT (between T31 and T32 of FIG. 6) in S402 and determines whether the RLF is expected (T33) in S404. When expecting the RLF in S404, the UE goes to S408. When not expecting the RLF in S404, the UE waits for the normal TTT in S406. Next, when the TTT ends, the UE goes to S310 of FIG. 9.

In S408, the UE determines whether the TTT exceeds the minimum TTT. When the TTT exceeds the minimum TTT in S408, the UE performs the solution 3 in S410. That is, the UE conducts S308, S310, and S312 of FIG. 9. The UE finishes the TTT early in S308 of FIG. 9, triggers handover by sending a handover triggering message to a source eNB in S310, and performs normal handover in S312.

When the TTT does not exceed the minimum TTT in S408, the UE waits a little longer in S412 and performs the solution 1 as shown in FIG. 7 from the T310 start in S414.

Referring to FIG. 10C, the solution 2 can be applied to the T310 start point (T30A) in the situation C, but the solution 1 can be applied to an interval (T30B) after the TTT start. However, the UE and the eNB operate in sequence on the time basis and thus cannot know whether the TTT starts when the solution 2 is applied. In an embodiment, the UE searches a handover (HO) target cell during the minimum T310 from the T310 start using the original A3 offset. That is, the UE applies the solution 1. When not discovering the HO target cell satisfying the original A3 offset even after the minimum T310, the UE discovers the HO target cell by applying the reduced A3 offset condition. That is, the UE applies the solution 2. This is to give the UE a chance to observe suitability of the target eNB a little bit more because unnecessary handover such as ping pong arises when the handover is conducted with the reduced A3 offset. Also, since the channel gain is naturally recovered and the T310 may be suspended, it is to prevent the handover from being rushed though there is no adequate target eNB right after the T310 start.

Figure 12:
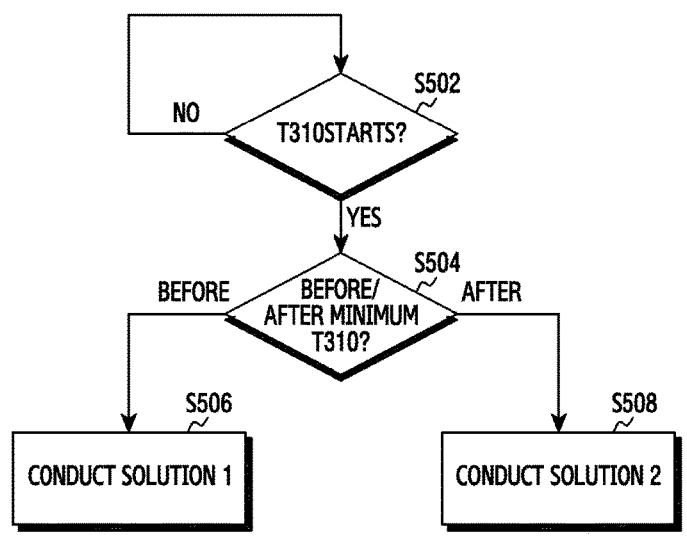
FIG. 12 is a flowchart of a method for selecting a plurality of solutions according to another embodiment of the present disclosure.

FIG. 12 is a flowchart of a method for selecting a plurality of solutions according to another embodiment of the present disclosure. This flowchart corresponds to selecting the solution 2 and the solution 1 in the situation C of FIG. 10C.

Referring to FIG. 12, when confirming an interval before the minimum T310 after the T310 start in S502 and S504, the UE uses the original A3 offset and the reduced TTT and applies the solution 1 in S506. That is, the UE applies the original A3 offset and the reduced TTT in S506. When detecting a target eNB after the T310 starts and the minimum T310 passes in S502 and S504, the UE applies the solution 2 in S508. That is, the UE applies the reduced A3 offset and the reduced TTT.

Referring to FIG. 10D, in the situation D, like the situation C of FIG. 10C, the UE applies the solution 2 at the T310 start point (T40A) and applies the solution 1 in an interval (T40B) after the TTT start. The situation D is the same the situation C, and the criterion for selecting the solution 1 and the solution 2 is illustrated in FIG. 12.

Figure 13:
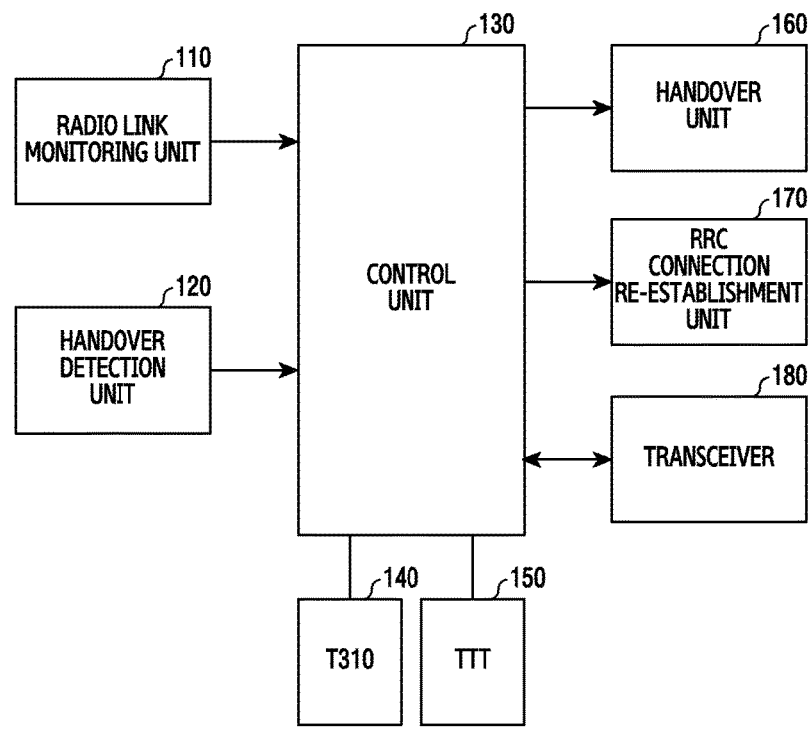
FIG. 13 is a block diagram of a User Equipment (UE) for processing handover and re-establishment according to an embodiment of the present disclosure.

FIG. 13 is a block diagram of a UE for processing handover and re-establishment according to an embodiment of the present disclosure.

Referring to FIG. 13, the UE includes a radio link monitoring unit 110, a handover detection unit 120, a control unit 130, a timer T310 140, a timer TTT 150, a handover unit 160, an RRC connection re-establishment unit 170, and a transceiver 180.

The radio link monitoring unit 110 monitors whether the radio link between the source eNB and the UE has a preset low channel gain. The handover detection unit 120 detects the target eNB for the handover. The control unit 130, the timer T310 140, the timer TTT 150, the handover unit 160, the RRC connection re-establishment unit 170, and the transceiver 180 function as a process execution unit. When at least one of the radio link having the low channel gain and the target eNB is detected, the process execution unit performs the handover within a shorter time than a preset normal time.

According to an embodiment, when the radio link having the low channel gain and the target eNB is detected under control of the control unit 130, the handover unit 160 sends a handover triggering message to a source eNB through the transceiver 180 after a short time passes. Also, when receiving a handover command from the source eNB through the transceiver 180 within a preset waiting time, the handover unit 160 performs handover. When not receiving the handover command from the source eNB within the waiting time under the control of the control unit 130, the RRC connection re-establishment unit 170 performs RRC connection re-establishment. Also, when receiving an ACK of a measurement report message from a serving eNB within the waiting time under the control of the control unit 130, the RRC connection re-establishment unit 170 may perform the RRC connection re-establishment immediately upon receiving the ACK of the measurement report message, without waiting until the waiting time.

According to another embodiment, when detecting the radio link having the low channel gain, the control unit 130 controls the detection unit 120 to detect a target eNB using a smaller offset than a preset RSRP offset. When detecting the target eNB under the control of the control unit 130, the handover unit 160 sends a handover triggering message to a source eNB through the transceiver 180 after a short time passes. Also, when receiving a handover command from the source eNB through the transceiver 180 within a preset waiting time, the handover unit 160 performs handover. When not receiving the handover command from the source eNB within the waiting time under the control of the control unit 130, the RRC connection re-establishment unit 170 performs RRC connection re-establishment. Also, when receiving an ACK of a measurement report message from a serving eNB within the waiting time under the control of the control unit 130, the RRC connection re-establishment unit 170 may perform the RRC connection re-establishment immediately upon receiving the ACK of the measurement report message, without waiting until the waiting time.

According to yet another embodiment, when detecting a target eNB, the control unit 130 detects whether a radio link having a low channel gain is expected within a normal time. When expecting the radio link having the low channel gain within the normal time under the control of the control unit 130, the handover unit 160 sends a handover triggering message to a source eNB through the transceiver 180 and performs handover with the source eNB. Also, when not expecting the radio link having the low channel gain within the normal time, the handover unit 160 sends a handover triggering message to the source eNB through the transceiver 180 after the normal time passes, and performs the handover with the source eNB.

In an embodiment, the short time is set such that the sum of the short time and the waiting time is smaller than the normal time. The waiting time is set by the source eNB or the UE.

In an embodiment, the waiting time is determined depending on the backhaul delay between the source eNB and the target eNB and the margin value.

In another embodiment, the waiting time is determined by considering the time waiting for the radio link to recover from the low channel gain to a high channel gain.

In yet another embodiment, the waiting time is determined by considering the time difference from the short time termination until a preset time passes after the radio link having the low channel gain is detected.

Figure 14:
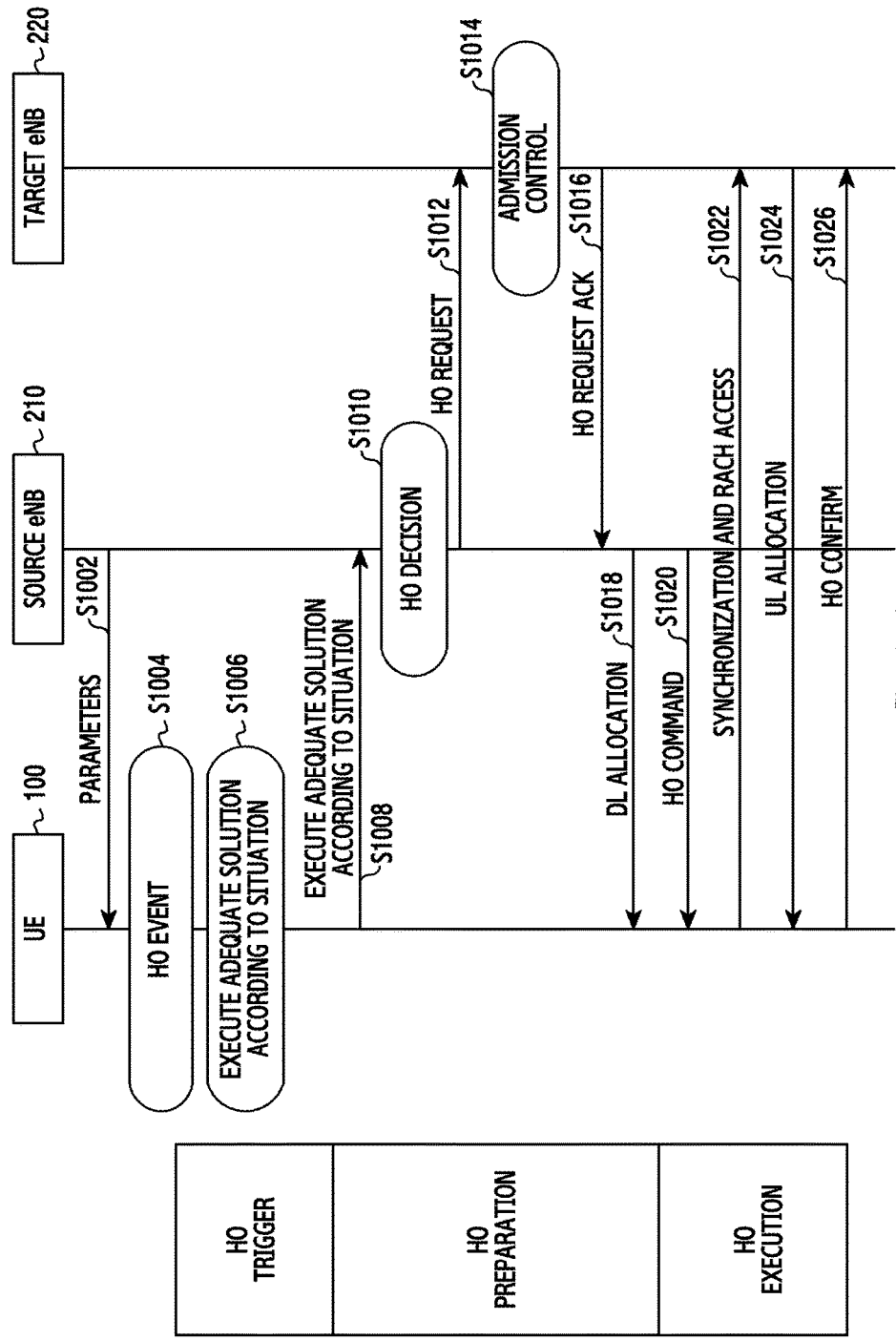
FIG. 14 is a diagram of processing handover between a UE, a source enhanced NodeB (eNB), and a target eNB according to an embodiment of the present disclosure.

FIG. 14 is a diagram of processing handover (HO) between a UE, a source eNB, and a target eNB according to an embodiment of the present disclosure. In FIG. 14, S1004 through S1008 correspond to HO triggering, S1010 through S1020 correspond to HO preparation, and S1022 through S1026 correspond to HO execution.

Referring to FIG. 14, in S1002, a source eNB 210 provides a UE 100 with parameters (information) for executing the operations according to embodiments of the present disclosure. For the operations of the one and another embodiments, the source eNB 210 notifies the normal handover timer (normal TTT), the reduced handover timer (reduced TTT), the normal A3 offset, the reduced A3 offset, and the waiting time Twait for waiting for the handover command message after the handover triggering, to the UE 100. For the operations of the yet another embodiment, the source eNB 210 notifies the RLF caution parameter, that is, $BLER_{RLF,margin}$ or $Q_{out,margin}$ to the UE 100. Also, the source eNB provides a speed dependent scaling factor so that the above-stated parameters can be scaled by a mobility state of the UE, that is, by a speed after quantization.

The UE 100 performs a HO event in S1004 and executes an adequate solution according to a situation in S1006. For example, the UE 100 executes the solutions as shown in FIG. 7 through FIG. 9 (or FIG. 4 through FIG. 6) according to the situation.

In S1008, the UE sends a HO triggering message to the source eNB 210. In so doing, the HO triggering message includes an indicator indicating urgent handover. The embodiments of the present disclosure provide the handover relating to the RLF, which is quite urgent handover in view of the UE. Hence, when sending the handover triggering message (e.g., measurement report), the UE specifies the urgent handover using a one-bit indicator.

The source eNB 210 receiving the handover triggering message determines handover in S1010 and sends a handover request message to a target eNB 220 in S1012.

The target eNB 220 receiving the handover request message determines whether the corresponding handover is urgent handover based on the one-bit indicator. Upon determining the urgent handover, the target eNB 220 controls to process the urgent handover before a non-urgent handover in the admission control in S1014 so that the UE 100 can receive a handover command message as soon as possible (i.e., before the RLF timer starts). The target eNB 220 sends a HO request response message HO Request ACK to the source eNB 210 in S1016.

In response to the received HO request response message HO Request ACK, the source eNB 210 allocates DL resource to the UE 100 in S1018 and sends the HO command message to the UE 100 in S1020.

The UE 100 receiving the HO command message preforms synchronization and RACH access to the target eNB 220 in S1022. Next, the target eNB 220 allocates UL resource in S1024. The UE 100 allocated the UL resource sends a HO confirm message to the target eNB 220 in S1026.

As such, according to embodiments of the present disclosure, when facing the corresponding situation, the UE first attempts the handover instead of the RRC connection re-establishment. When the handover is successful, the UE can reduce service interruption compared with the RRC connection re-establishment of the related art. Even when the handover fails, additional delay does not arise in view of the time compared with the RRC connection re-establishment. This is because the parameters such as the reduced TTT and Twait are defined in advance in order to prevent it.

While the invention has been shown and described with reference to certain exemplary embodiments thereof, those of ordinary skill in the art will recognize that various changes and modifications of the embodiments described herein can be made without departing from the scope and spirit of the invention. For example, while exemplary embodiments of the present disclosure are applied to the LTE-Advanced system, the scope of the present disclosure is not limited to that system. For example, while the exemplary embodiments of the present disclosure are fulfilled by the components of the UE as shown in FIG. 13, the scope of the present disclosure is not limited to those components. The operations according to embodiments of the present disclosure can be realized by the single control unit 130. In this case, program instructions for executing the operations realized by various computers can be recorded on a computer-readable medium. The computer-readable medium can include program instructions, data files, and data structures, alone or in combination. The program instructions may be specially designed and configured or known to those of ordinary skilled in the art. Examples of the computer-readable medium can include a hard disk, a floppy disk and a magnetic medium such as a magnetic tape, an optical recording medium such as Compact Disc (CD)-Read Only Memory (ROM) or a Digital Versatile Disc (DVD), magneto-optical medium such as floptical disk, and hardware devices specially configured to store and execute program instructions such as ROM, Random Access Memory (RAM), and flash memory. Examples of the program instructions can include not only machine code made by a compiler but also high-level language code executable by a computer using an interpreter. When all or part of a base station or a relay explained in the present disclosure is realized as a computer program, a computer-readable recording medium storing the computer program is also included in the present disclosure. One of ordinary skill in the art would recognize other combinations are possible. Accordingly, the invention is intended to be embraced by all the other replacement, modifications and variations that fall within the scope of the following claims.

The invention claimed is:

1. A method for operating a user equipment (UE) in a wireless communication system, the method comprising:

starting a first timer upon triggering a measurement report while a second timer regarding a radio link failure (RLF) is running;

in response to an expiry of the first timer while the second timer is running, initiating a radio resource control (RRC) connection re-establishment;

in response to an expiry of the second timer while the first timer is running, initiating the RRC connection re-establishment; and upon initiating the RRC connection re-establishment, stopping the first timer or the second timer.

2. The method of claim 1, further comprising:

in response to receiving a command for a handover before an expiry of the first timer, performing the handover.

3. The method of claim 1, the measurement report is triggered in response to detecting that a condition related to the measurement report is met during a time to trigger (TTT).

4. The method of claim 3, wherein the condition is defined based on a reference signal received power of a serving base station, a reference signal received power of a target base station and a power offset value.

5. The method of claim 3, wherein a sum of a length of the TTT and a length of the first timer is smaller than a length of the second timer.

6. The method of claim 3, further comprising:

receiving a power offset value related to the condition.

7. The method of claim 6, wherein the power offset value is determined based on a scaling factor and a pre-determined received power offset value.

8. The method of claim 1, further comprising:

upon receiving a message in response to the measurement report before an expiry of one of the first timer and the second timer, stopping the first timer and the second timer.

9. A user equipment (UE) in a wireless communication system, the UE comprising:

at least one transceiver; and at least one processor operatively coupled to the at least one transceiver, wherein the at least one processor is configured to:

start a first timer upon triggering a measurement report while a second timer regarding a radio link failure (RLF) is running, in response to an expiry of the first timer while the second timer is running, initiate a radio resource control (RRC) connection re-establishment, in response to an expiry of the second timer while the first timer is running, initiate the RRC connection re-establishment; and upon initiating the RRC connection re-establishment, stop the first timer or the second timer.

10. The UE of claim 9, wherein the at least one processor is further configured to perform a handover, in response to receiving a command for the handover before an expiry of the first timer.

11. The UE of claim 9, the measurement report is triggered in response to detecting that a condition related to the measurement report is met during a time to trigger (TTT).

12. The UE of claim 11, wherein the condition is defined based on a reference signal received power of a serving base station, a reference signal received power of a target base station and a power offset value.

13. The UE of claim 11, wherein a sum of a length of the TTT and a length of the first timer is smaller than a length of the second timer.

14. The UE of claim 11, wherein the at least one processor is further configured to:

receive a power offset value related to the condition.

15. The UE of claim 14, wherein the power offset value is determined based on a scaling factor and a pre-determined received power offset value.

16. The UE of claim 9, wherein the at least one processor is further configured to stop the first timer and the second timer, upon receiving a message in response to the measurement report before an expiry of one of the first timer and the second timer.

17. The method of claim 1, further comprising:
   receiving, from a base station, information for configuring the first timer.

18. The UE of claim 9, wherein the at least one processor is further configured to receive, from a base station, information for configuring the first timer.

* * * * *